United States Patent [19]

Dogliotti

[11] 4,106,657

[45] Aug. 15, 1978

[54] CONTAINER USABLE AS A TOY CONSTRUCTION ELEMENT

[75] Inventor: Amilcare Dogliotti, Neive (Cuneo), Italy

[73] Assignee: P. Ferrero & C. S.p.A., Alba (Cuneo), Italy

[21] Appl. No.: 706,406

[22] Filed: Jul. 19, 1976

[30] Foreign Application Priority Data

Sep. 17, 1975 [IT] Italy .............................. 53338/75[U]

[51] Int. Cl.² ...................... B65D 21/02; A63H 33/08
[52] U.S. Cl. ...................................... 220/23.4; 46/23; 46/25; 206/504; 215/10; 220/4 C; D34/15 FF
[58] Field of Search ...................... 220/4 C, 4 E, 23.4; 206/504; D34/15 FF, 15 GG; 46/25, 23; 215/10

[56] References Cited

U.S. PATENT DOCUMENTS

| 176,144 | 4/1876 | McDougall | 46/25 |
| D. 197,655 | 3/1964 | Kuhn | D34/15 GG |
| 2,998,896 | 9/1961 | Miller | 220/352 |
| 3,374,917 | 3/1968 | Troy | 220/23.4 |
| 3,496,670 | 2/1970 | Sloop | 46/25 |
| 3,604,130 | 9/1971 | Forsstrom | 46/25 |
| 3,611,621 | 10/1971 | Folson | 46/25 |
| 3,902,270 | 9/1975 | Molenaar | 206/504 |

FOREIGN PATENT DOCUMENTS

960,965 6/1964 United Kingdom .......................... 46/25

*Primary Examiner*—George E. Lowrance
*Attorney, Agent, or Firm*—Sughrue, Rothwell, Mion, Zinn & Macpeak

[57] ABSTRACT

A container for small gifts, suitable to be enclosed in an Easter-egg or like hollow product, which is formed in two cup-shaped snap engageable parts and which is usable as a construction element for which purpose each of the cup-shaped snap engageable parts are provided with a plurality of holes in their side walls with which can be snap engaged a mushroom headed projection which projects from the bottom of one of the two parts, the bottom of the other part being formed with a further hole to receive a mushroom headed projection of another such element.

1 Claim, 6 Drawing Figures

CONTAINER USABLE AS A TOY CONSTRUCTION ELEMENT

The present invention relates to a container which is shaped and constructed so that it can be re-used, after the contents have been removed, as a toy construction element.

According to the present invention, there is provided a container for gifts, suitable to be contained in an Easter-egg or like hollow product, characterised in that it comprises two cup-shaped parts snap engageable together at their rims in such a manner as to form a container in the form of a generally ovoid barrel, a first of the said cup-shaped parts having a plurality of holes in its side wall and a hole in its bottom, and a second of the said cup-shaped parts having a plurality of holes in its side wall and a mushroom headed projection extending from its bottom the said mushroom headed projection being snap engageable with any of the holes in the side walls or the bottom of the first or second part of another like container.

Embodiments of this invention are particularly suitable as containers for small gifts such as those enclosed in Easter-eggs or cereal packets or the like since when the gift has been removed the container itself is useful and can be re-used indefinitely as a toy construction element.

One embodiment of the invention will now be more particularly described, by way of example, with reference to the accompanying drawings, in which.

Figure 1:
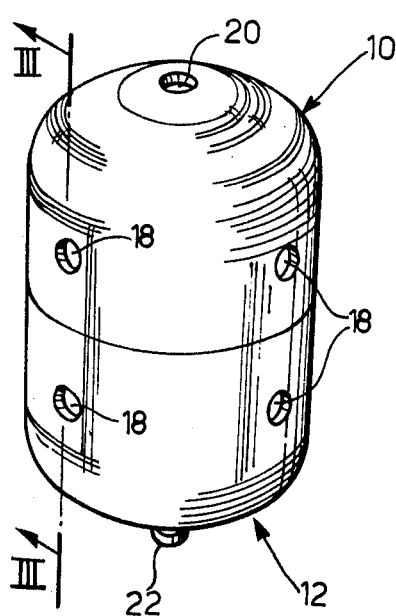
FIG. 1 is a perspective view of the embodiment of the invention in the assembled or closed condition.
Figure 2:
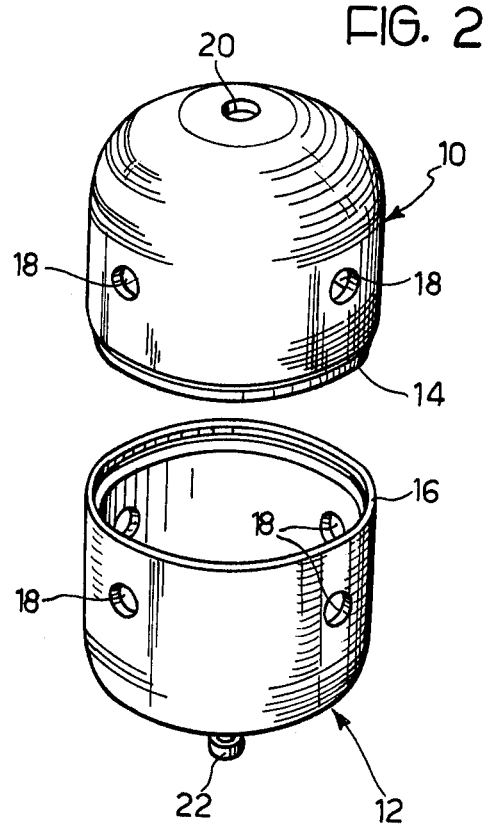
FIG. 2 is a perspective view, shown from the same angle as, FIG. 1, but in which the two parts constituting the container are shown separated.
Figure 3:
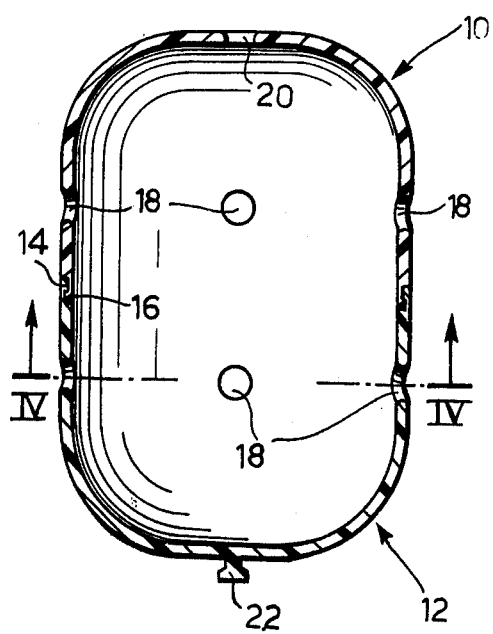
FIG. 3 is an axial section of the container illustrated in FIGS. 1 and 2, taken on the line III—III of FIG. 1.
Figure 4:
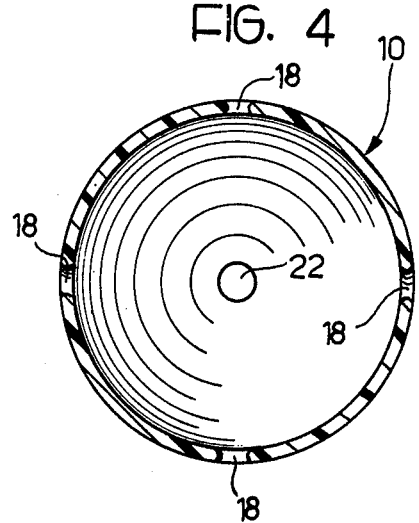
FIG. 4 is a cross-section taken on the line IV—IV of FIG. 3.

Referring now to FIGS. 1 to 4, the container shown comprises two first and second main parts 10 and 12 respectively of opaque or transparent plastics material which may be coloured or left natural. In view of the fact that one use envisaged for this container is for it to be enclosed in an Easter-egg or similar product, in which case it will be in contact with an edible material, the plastics material must be of a type suitable for use with food products.

Each of the two main parts 10, 12, as will be seen from the drawings, is in the form of a parallel sided, generally circular cup. The first part 10 is provided, around its rim, with an outer rebate on which is formed a radially outwardly projecting circumferentially extending ridge. The second part 12 has around its rim an inner rebate on which is formed a circumferential groove 16 into which the ridge 14 on the first part 10 can snap engage, due to the resilience of the material, to hold the two parts together.

When the two parts 10 and 12 are snap engaged together in the manner described above, they form a container in the form of a generally ovoid barrel as can be seen in FIG. 1.

Both the first part 10 and the second part 12 have in their side walls a number of holes 18 which, in the embodiment shown, are four in number, disposed at right angles to one another and lying in a common plane parallel to the rim of the cup. Moreover, the first part 10 has a hole 20 in the bottom of the cup and the second part 12 has projecting from the bottom of the cup, a mushroom headed projection 22. The mushroom headed projection is capable of being snap engaged into any of the holes 18 in the side walls of a first cup-shaped part 10 or a second cup-shaped part 12 of another such container, or into the hole 22 in the bottom of a first part 10 of another such container. It will be appreciated that all the holes 18, 20 are the same size.

Figure 5:
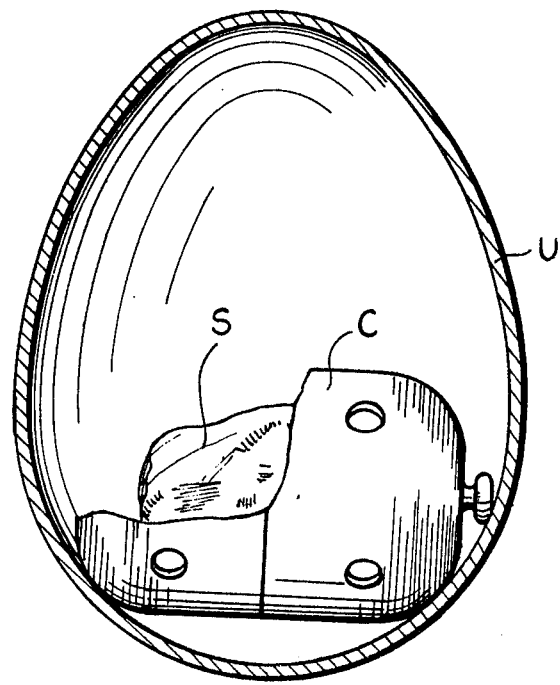
FIG. 5 is a sectional view of an Easter-egg containing a container as shown in FIGS. 1 to 4, the containers being shown cut-away to reveal a small gift contained therein.

In FIG. 5 a container according to the invention, indicated by the reference C, has been shown located within an Easter-egg U and enclosing a small gift S.

Figure 6:
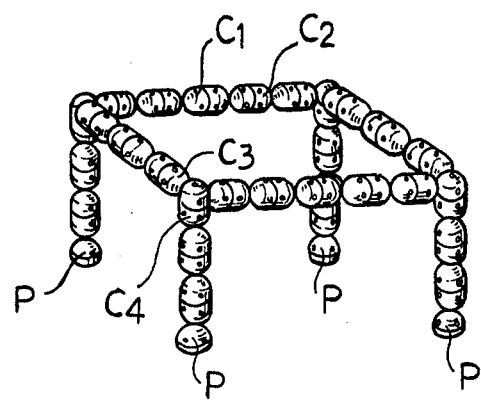
FIG. 6 is a perspective view illustrating a possible construction which can be made using a number of containers such as the embodiment of the invention illustrated in FIGS. 1 to 4.

FIG. 6 illustrates one of the many toy structures which, it is envisaged, can be made using toy construction elements cum containers formed as embodiments of the present invention. In the example shown in FIG. 6 the structure shown in the framework of a small table. It can be seen from this Figure how a number of containers or construction elements, such as $C_1$, $C_2$ are coupled end to end by engaging the mushroom headed projection 22 of the second part 12 of one container into the hole 20 in the bottom of the first part 10 of the adjacent container, whilst the other containers or construction elements, such as $C_3$, $C_4$, are coupled at right angles, that is, with the mushroom headed projection of the container $C_3$ snap engaged into one of the holes in the side wall of one of the first or second parts of the container $C_4$. It is also possible to use either the first part 10, or the second part 12, of a container alone, without joining it as its rim to a cooperating second part or first part respectively.

What is claimed is:

1. A container for gifts, suitable to be used as a toy construction element, said container comprising:
   first and second substantially equal size cup-shaped parts,
   means on said first and second parts permitting snap engagement of said parts together at their rims in such a manner as to form a container in the form of a generally ovoid barrel having a smooth hollow interior,
   means defining a plurality of holes in the side wall of the first of said cup-shaped parts spaced from the rim of said first part and lying in a common plane parallel to said rim,
   means defining a hole in the bottom of said first of said cup-shaped parts,
   means defining a plurality of holes in the side wall of the second of said cup-shaped parts spaced from the rim of the second part and lying in a common place parallel to said rim, and
   a mushroom headed projection extending outwardly from the bottom of the second of said cup-shaped parts, said mushroom headed projection being snap engageable with any of the holes in the side walls or the bottom of the first or second parts of another like container.

* * * * *